Feb. 20, 1934.   R. L. PAYNE ET AL   1,948,277
AIR CONDITIONER AND HUMIDIFIER
Filed July 25, 1932

Inventors
Raymond L. Payne,
Glen E. Marica.
By
Attorney

Patented Feb. 20, 1934

1,948,277

UNITED STATES PATENT OFFICE 1,948,277

AIR CONDITIONER AND HUMIDIFIER

Raymond L. Payne and Glen E. Marica, Denver, Colo.

Application July 25, 1932. Serial No. 624,410

4 Claims. (Cl. 261—92)

This invention relates to improvements in air conditioners and humidifiers and has reference to an improved device of the type described and claimed by us in our co-pending application, Serial Number 657,500 filed February 20, 1933.

The importance of having proper humidity in the air in buildings is now realized by practically everyone, and many devices are in use for producing the desired humidity and also for cooling the air during the heated summer months.

It is the object of this invention to produce a simple and highly efficient device of the class to which reference has been made, which shall be so constructed that it will produce a very fine spray or mist of water with which the air will contact and which will also have means for separating the excess moisture from the air before this enters the rooms.

Another object of this invention is to produce a vaporizer or spray producing device of a very simple construction that shall be adapted to produce a uniform mist or spray on all sides of the axis on which it is rotating so that all the air that passes through the compartment in which it is rotating will be acted upon uniformly.

Another object is to produce a spray forming device having a disk that can be rotated at a high speed in a substantially vertical plane and to which water is supplied at the periphery from a trough and at the sides adjacent the axis of rotation by a separate means.

The vaporizer or spray forming device that forms a part of this invention, briefly described, consists of a wheel formed from a circular disk and a plurality of annular metal disks secured together by suitable means and spaced short distances apart. Means are provided for rotating this wheel and for delivering water to the interior of the annular assembly whereby centrifugal force will cause this water to be thrown outwardly between the several rings so as to produce a uniform mist or spray.

Another object of this invention is to produce an assembly of which the spray forming device is an element and which shall be adapted to be placed in a room and connected with an electric circuit so as to produce a circulation of air and the required amount of humidity.

Having thus briefly described the invention the same will now be described in detail, and for this purpose reference will be had to the accompanying drawing in which the invention has been illustrated, and in which.

Figure 1:
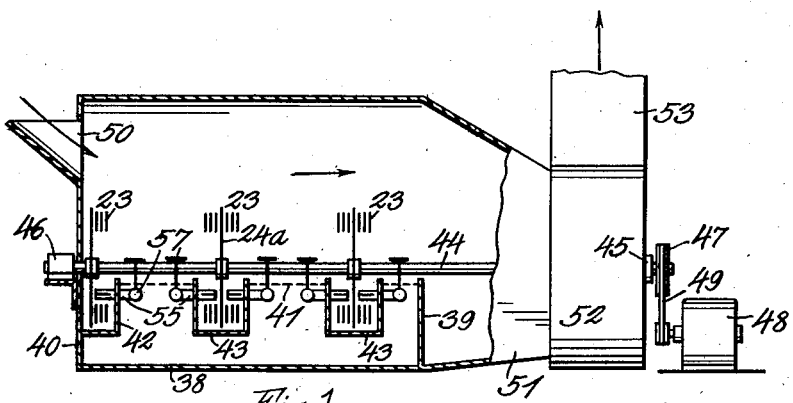
Fig. 1 is a longitudinal section on a vertical plane of one form of the apparatus.
Figure 2:
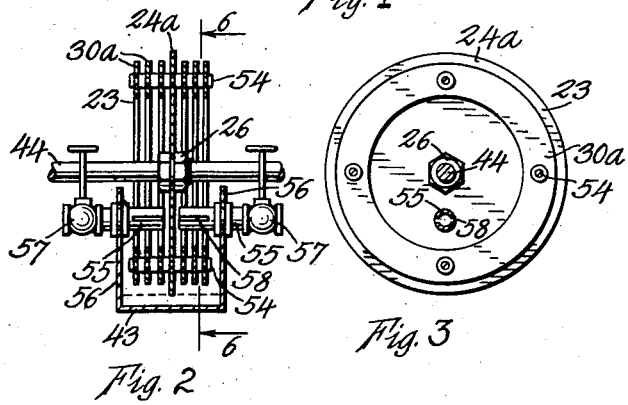
Fig. 2 is a diametrical section through one of the spray forming devices shown in Fig. 1.
Figure 3:
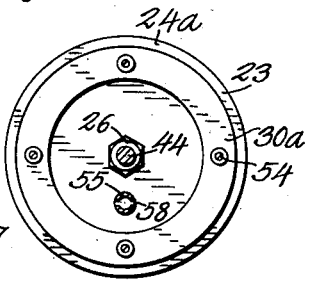
Fig. 3 is a section taken on line 6—6, Fig. 2.

Where the device is to be used for conditioning air for buildings of large size, or for factories or any place where a large capacity is required, the invention is embodied in a structure like that shown in Figs. 1, 2 and 3, and in which the bottom of the tank has been indicated by reference numeral 38. An end wall 39 extends upwardly and forms with the sides and the end 40 a tank in which water can be maintained up to the level line indicated by reference numeral 41. Located in the tank are a number of transverse troughs. The end trough has been designated by reference numeral 42, and the others by reference numeral 43. Located above the troughs and extending transversely of the same is a shaft 44. The ends of the shaft are journaled in bearings 45 and 46. One end of the shaft is provided with a pulley 47 to which power is transmitted from a motor 48 by means of a belt 49. The sides of the tank extend upwardly and are connected at the top so as to form an enclosed chamber. One end of the chamber has an opening 50 through which air may enter, the other end has inwardly inclined walls 51 that connect with the intake of a centrifugal fan 52. The blades of the fan have not been shown, but they are connected with the shaft 44 and the fan is merely an ordinary centrifugal blower of usual construction.

When the motor is operating so as to drive air outwardly through the discharge conduit 53, air will enter the compartment through the opening 50 as indicated by the arrow. In order to produce a mist or spray within the housing, a number of spray forming devices have been secured to the shaft there being one for each of the troughs. Each spray forming device is formed from a disk 24a, to which are secured rings 30a. These rings are held in place on the disk 24a by means of bolts or rivets 54. The distance between the several rings is controlled to a greater or lesser extent by the results that are desired, and where a very fine mist is to be used, the distance between the disks is made smaller than if a coarse spray is wanted. For the purpose of delivering water to the inside of the rotating spray device, pipes 55 have been provided in the walls 56 of the troughs. These pipes are preferably provided with valves 57 or other equivalent means to control the amount of water that flows through them into the troughs. It will be seen from Figs. 2 and 3 that pipes 55 are provided with diametrically located slots 58 through which the water may pass into the interior of the rotating spray forming device. It will be seen from Fig. 2 that the ends of pipes 55 terminate near the surfaces of disk 24a and therefore water discharged from the pipes will be brought into contact with the sides of the disk between the periphery and the axis. When the shaft 44 is turning and valves 57 are open, water will pass inwardly through the pipes 55 and be deposited on the sides of the disk and on the inside of the rings from which it will be quickly thrown outwardly due to the action of centrifugal force. In the device illustrated, the ring marked 24a is larger in diameter than the others, and as a result of this the water level within the trough will be maintained at a point like that indicated by reference numeral 58, which it will be seen is below the outer edges of disks 30a. The action of all the disks is to throw water out of the trough as soon as they start rotating, and by having one disk a little larger than the others the level of the water will be reduced so that only a single disk contacts with the water during operation and therefore the power necessary to rotate the disks is greatly reduced.

It is evident that the quantity of water converted into spray by disk 24a in a given time can be controlled, independently of the speed of rotation by means of valve 57. The action of the spray forming device can therefore be regulated without necessitating a variation or change in the speed of rotation.

From Fig. 3, which shows a side elevation, it will be seen that the disks 30a are merely annular rings of metal that are secured to the central disk 24a by means of bolts 54.

The distance between the adjacent surfaces of the rings comprising the spray forming device depends upon the amount of water that is employed and the fineness of the spray that is desired and therefore should be determined for each installation so as to obtain the best results under the conditions prevailing. As a rule the disks are placed so close together that the water will contact both sides in passing through but this is not an essential condition.

The drawing of the spray forming device has been illustrated more or less diagrammatically, but it is to be understood that the diameter of the rings and the distances between their adjacent surfaces can be varied to suit the conditions under which the machine is operating. It will be seen from the above description and the drawing, that when shaft 44 is rotating at a high speed and valves 57 are open, water will flow from the tank through pipes 55 into the inside of the spray device and towards the sides of the disk 24a, and will be thrown outwardly in the form of a mist or spray and at the same time a strong current of air will pass through the housing and across the water spray, where it will have its temperature reduced due to the action of the rapid evaporation that takes place and will also be charged with moisture so as to get the desired humidity; in case there is any dust or dirt in the air, this will be collected by the water particles and returned by them to the tank, and the air that passes upwardly through the discharge opening 53 will therefore be clean, cool and moist.

Attention is called to the fact that in the device described the periphery of the disk 24a rotates in contact with the water in the trough and also has water directed towards its sides. The water that is discharged directly onto the side of the disk will stay on the disk longer than that which is applied to its periphery and therefore will be discharged later.

Having described the invention what is claimed as new is:

1. A spray forming device comprising a horizontal shaft, a disk like member secured thereto, a plurality of rings secured to the disk in concentric relation thereto, and spaced apart, said disk being of larger diameter than said rings so as to project outwardly, whereby when the assembly is rotating in contact with water the level of the water will be lowered below the peripheries of the rings but not below the periphery of the disk.

2. A spray forming device comprising, in combination a tank adapted to contain a liquid, a horizontal shaft mounted for rotation, a disk-like member secured to the shaft so as to be rotated thereby, a trough located in the tank below the shaft and in the plane of the disk, the upper edge of the trough extending above the normal liquid level in the tank, the lower edge of the disk extending into the trough to a point below the normal liquid level in the tank, and controlled means communicating the tank and the trough, for conducting water from the tank to the trough and terminating in proximity to the disk at a point between the periphery and the axis, so that upon rotation of the disk, the liquid in the trough will be converted into spray and its normal level will be lowered to a point slightly above the lower periphery of the disk and water will be delivered at a controlled rate against the disk at a point substantially above the lower edge thereof.

3. A spray forming device comprising, in combination, a storage tank for a liquid, a trough located in the tank with its upper edge extending above the normal liquid level in said tank, a disk-like member mounted for rotation in a vertical plane and about an axis lying above the trough, the lower edge of the disk extending into the trough to a point below the liquid level in the tank, and controlled means communicating the tank and trough extending from below the normal liquid level of the tank and terminating in proximity to the disk at a point between the periphery and the axis, so that upon rotation of said disk, the liquid in said trough will be converted into spray and its normal level lowered to a point slightly above the periphery of the disk and water from the tank will be delivered at a controlled rate against the disk at a point substantially above the lower edge thereof.

4. A spray forming device comprising, in combination, a container for water, a horizontal shaft located above the container, a disk-like member secured to the shaft, a plurality of rings secured to the disk in concentric relation thereto, said rings being spaced apart, said disk being of larger diameter than said rings so as to project outwardly, whereby when the assembly is rotating in contact with water in the container, the level of the water will be lowered below the peripheries of the rings but not below the periphery of the disk, and means for discharging water at a controlled rate into the hollow rim formed by the rings.

RAYMOND L. PAYNE.
GLEN E. MARICA.